No. 716,943. Patented Dec. 30, 1902.
J. SCOTT.
ROTARY PLOW.
(Application filed June 20, 1902.)
(No Model.) 2 Sheets—Sheet 1.

No. 716,943. Patented Dec. 30, 1902.
J. SCOTT.
ROTARY PLOW.
(Application filed June 20, 1902.)

(No Model.) 2 Sheets—Sheet 2.

Witnesses
M. E. Tucker
Harry Ellis Chandlee

Inventor
John Scott
By Chandlee & Chandlee
Attorneys

UNITED STATES PATENT OFFICE.

JOHN SCOTT, OF EDINBURGH, SCOTLAND.

ROTARY PLOW.

SPECIFICATION forming part of Letters Patent No. 716,943, dated December 30, 1902.

Application filed June 20, 1902. Serial No. 112,485. (No model.)

*To all whom it may concern:*

Be it known that I, JOHN SCOTT, a subject of the King of the United Kingdom of Great Britain and Ireland, residing at 87 Mayfield road, Edinburgh, Scotland, have invented a certain new and useful Rotary Plow, (for which application for patent has been made in Great Britain, No. 24,266, dated November 29, 1901,) of which the following is a specification.

This invention relates to cultivating apparatus of the kind in which the operating mechanism and cutters are carried by a motor-vehicle; and it has for its object to adapt such apparatus for dealing with fallow or grass land by providing it with devices for cutting into and turning over the land after the fashion of a plow.

Figure 3:
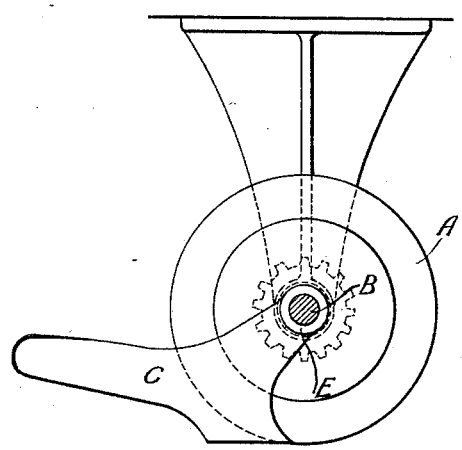
Figure 1:
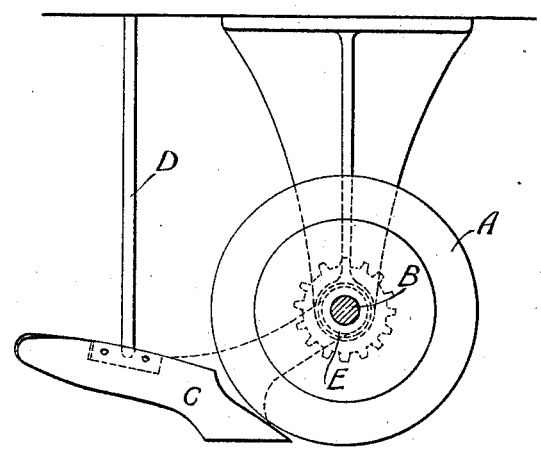
Figure 2:
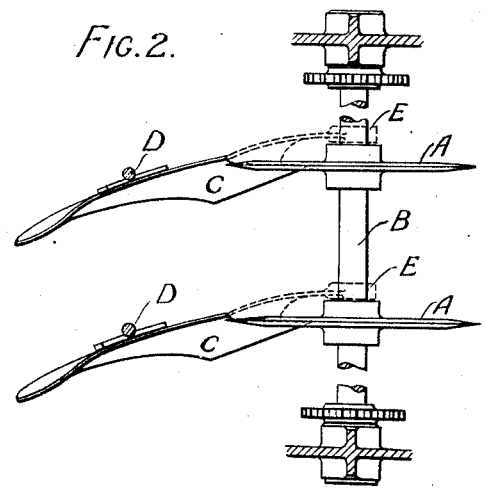
Figure 4:
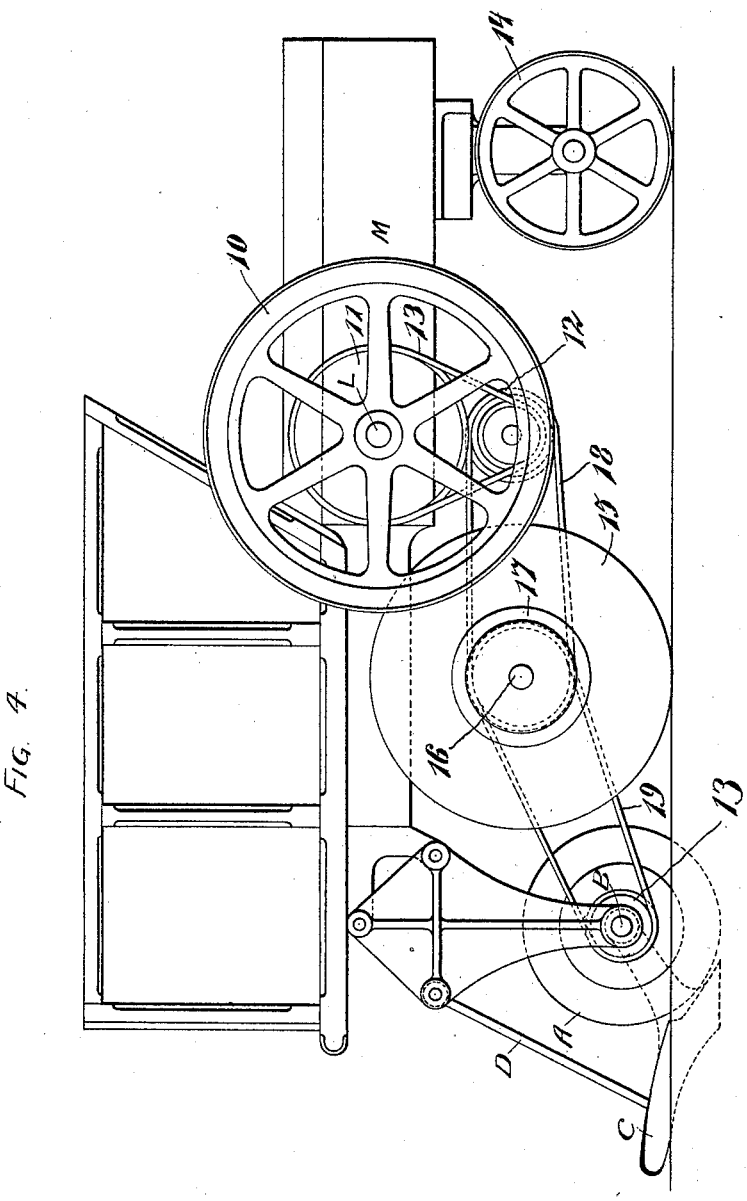

In the accompanying drawings, which illustrate my invention, Figure 1 is a side elevation, and Fig. 2 a plan, of the improved cultivating apparatus as attached to the bottom framing of the motor-vehicle. Fig. 3 is a side elevation showing a modification. Fig. 4 is a side elevation of a motor-vehicle with the improved cultivating apparatus attached.

There is shown in the drawings a motor-vehicle M, having the motor-shaft L, on which is the fly-wheel 10 and the driving-pulley 11, which latter is connected with the cone-pulley 12 by means of the pulley 13. The vehicle is provided with front supporting-wheels (illustrated at 14) and with rear driving-wheels 15, there being only one of these latter wheels illustrated in the side elevation. The shaft 16 of the driving-wheels or traction-wheels has a cone-pulley 17, with which are engaged belts 18 and 19, leading, respectively, to the cone-pulley 12 and the pulley 13 on the shaft B, on which is keyed a cutting-disk A. In conjunction with the cutting-disk A is employed a moldboard C, which is rigidly fixed to the frame of the vehicle, preferably by means of a stay D. The forward end of the moldboard enters the ground closely behind the forward lower quarter-section of the cutting-disk A, and the moldboard may be set at any angle or curve.

As shown in dotted lines in Fig. 1, the forward extremity of the moldboard A may be in the shape of an eye E, loosely centered on the shaft B, with its main portion following or being drawn behind the vertical center line of the rotating disk A, so that the moldboard acts like the moldboard of an ordinary plow to turn over the soil loosened by the rotating cutting-disk A. The modification represented at Fig. 3 also shows the moldboard formed with an eye E, loosely centered on the shaft B and fitted as above described, but without the stay D.

The cutting-disk A is driven from the motor at a higher speed than that due to the forward motion of the vehicle, so as to increase its impression on the soil.

One rotating shaft B, as shown in the drawings, may carry more than one cutting-disk, each disk A being used in conjunction with a fixed moldboard.

Having now described my invention, what I claim, and desire to secure by Letters Patent, is—

1. In motor-cultivators the combination of a rotating cutting-disk, driven from the motor of the vehicle as described, and a moldboard secured by means of a stay to the vehicle in rear of the disk as and for the purpose set forth.

2. In motor-cultivators the combination of a cutting-disk driven from the motor of the vehicle as described and a moldboard having its forward end loosely centered on the shaft of said disk, as and for the purpose set forth.

3. In motor-cultivators the combination of a cutting-disk driven from the motor of the vehicle as described, and a moldboard having its forward end loosely centered on the shaft of said disk, behind which it is secured by a stay connected to the vehicle-body, as and for the purpose set forth.

In witness whereof I have hereunto set my hand in presence of two witnesses.

JOHN SCOTT.

Witnesses:
WALLACE FAIRWEATHER,
WALLACE CRANSTON FAIRWEATHER.